United States Patent [19]

Heisch et al.

[11] Patent Number: 5,659,752

[45] Date of Patent: Aug. 19, 1997

[54] SYSTEM AND METHOD FOR IMPROVING BRANCH PREDICTION IN COMPILED PROGRAM CODE

[75] Inventors: Randall Ray Heisch, Georgetown; Sohel Riazuddin Saiyed, Austin, both of Tex.

[73] Assignee: International Business Machines Corporation, Armonk, N.Y.

[21] Appl. No.: 497,303

[22] Filed: Jun. 30, 1995

[51] Int. Cl.[6] ................................................ G06F 9/45
[52] U.S. Cl. .................... 395/704; 395/709; 395/183.11; 395/183.14; 395/586
[58] Field of Search ................................... 395/700, 704, 395/709, 183.11, 183.14, 586

[56] References Cited

U.S. PATENT DOCUMENTS

| | | | |
|---|---|---|---|
| 4,430,706 | 2/1984 | Sand | 364/200 |
| 5,212,794 | 5/1993 | Pettis et al. | 395/700 |
| 5,367,703 | 11/1994 | Levitan | 395/800 |
| 5,530,964 | 6/1996 | Alpert et al. | 395/700 |
| 5,539,907 | 7/1996 | Srivastava et al. | 395/700 |

OTHER PUBLICATIONS

IBM Technical Disclosure Bulletin, vol. 36, No. 08, Aug. 1993, p. 241, "Adaptive Branch Prediction".

*Primary Examiner*—Kevin A. Kriess
*Assistant Examiner*—Kakali Chaki
*Attorney, Agent, or Firm*—Mark S. Walker

[57] ABSTRACT

A method and system for optimizing branch prediction in an executable computer program compiled for execution on a pipelined processor that employs branch prediction. The source program is compiled and, in one embodiment, instrumented to collect branch selection statistics. The compiled program is run and statistics collected using the instrumentation or a standard trace program. The branch statistics are used to modify the executable program to cause branch prediction to be correct a majority of the time for the workload against which the program was run. In a computer system having a branch prediction bit, that bit is set or cleared to cause correct branch prediction a majority of the time.

3 Claims, 2 Drawing Sheets

SYSTEM AND METHOD FOR IMPROVING BRANCH PREDICTION IN COMPILED PROGRAM CODE

BACKGROUND OF THE INVENTION

1. Field of the Invention

The present invention relates to improvements in compiler technology. In particular, the present invention relates to improvements in a source code compiler for a pipelined data processing system that predicts branch instruction results and uses that prediction to increase system performance. Still more particularly, the present invention relates to a system for using execution profile data from a test compilation to provide feedback to the compiler to optimize the final executable code based on that profile data.

2. Background and Related Art

Compilation is the process of transforming program source code written in a human intelligible language into a form executable by a data processing system. Compilation transforms each language statement into one or more machine language statements. Typically, the compiler will perform the transformation in phases or passes. The first pass of the compiler typically transforms the source code into an intermediate form. The second pass typically performs code optimization and then generates the final executable machine language for the target platform.

Code optimization is a well developed area of compiler technology. Code optimization includes attempts to improve the performance of program execution by rearranging the code so that it executes faster but with the same functional operation. An example, is optimization by bringing the instructions from a subroutine into the main body of code to avoid the overhead of subroutine call and return.

Pipelined data processing systems have been developed to increase system throughput. A pipelined system breaks the interpretation and execution of an instruction into sequences that can be executed in parallel. The sequence of Instruction Fetch, Instruction Decode and Instruction Execute is performed in parallel so that an instruction is executed, ideally, each machine cycle. The Instruction Decode step places the decoded instruction on an instruction queue. The Instruction Execution unit then takes the next instruction from the instruction queue for execution.

Pipelined processing offers performance improvements only if the instruction stream is not interrupted, i.e. the instruction pipeline remains full and no pipeline stalls or "bubbles" are introduced. The instruction stream can be interrupted when the program calls for the execution of an instruction out of sequence. This occurs, for example, when a conditional branch instruction is encountered. Program code may have the form:

If x>1 then y=1;

Else y=0

If x is less than or equal to 1 the next statement "y=1" is skipped and execution branches to the statement "y=0." If the machine instructions for assigning 1 to y have been fetched and decoded, these instructions must be purged from the instruction queue and the execution unit must wait until the instructions for setting y=0 reach the top of the queue. This waiting results in several lost machine cycles and a corresponding reduction in system throughput. Conditional branches can induce pipeline stalls due to the latency in determining the outcome of the branch condition. The processor typically employs some level of branch prediction in an attempt to keep the pipeline full by selecting what is hopefully the correct path.

The impact of conditional branches is significant because most program code contains a significant number of branches. Very little useful code is executed sequentially from top to bottom. The performance of a system can be improved by improved branch prediction.

Branch prediction attempts to predict which set of instructions will be executed after a branch: the "branch taken" set; or the "branch not taken" set. If the prediction is correct the system loses no time due to instruction stall waiting for the correct instruction. If the prediction is incorrect the queue must be flushed and the new instructions loaded with a resulting performance degradation.

Both hardware based and software based branch prediction solutions have been proposed. U.S. Pat. No. 5,367,703 entitled "Method and System for Enhanced Branch History Prediction Accuracy in a Superscalar Processor System" to Levitan maintains a branch history table for each fetch position within a multi-instruction access. The branch history table is used to predict whether a branch will be taken or not taken. The branch history table consists preferably of a two bit binary counter that is incremented or decremented depending on whether or not the branch is taken.

An article entitled "Adaptive Branch Prediction" in the *IBM Technical Disclosure Bulletin*, Vol. 36, No. 8, August 1993 by D. S. Levitan and D. E. Waldecker suggests a system for predicting branches based on run-time branch statistics or on historical branch statistics or on both during a single program execution. An indicator is used to indicate when the processor should switch between historical and run time prediction.

U.S. Pat. No. 4,430,706 entitled "Branch Prediction Apparatus and Method for a Data Processing System" collects branch taken statistics in memory hashed by instruction address. This allows the system to access the history whenever that instruction is encountered.

IBM RISC System/6000 processors always choose to predict that a conditional branch is not taken. IBM PowerPC processors (PowerPC is a trademark of IBM) introduce a more sophisticated test based on three variables: 1) the branch condition type; 2) the branch displacement sign bit; and 3) a branch predict bit ("Y bit"). If the branch condition type is "branch always" or if the branch displacement sign bit is set (i.e. a negative branch displacement) then the branch is predicted taken if the Y bit is zero and predicted not taken if the Y bit is one. Otherwise, the branch is predicted not taken if the Y bit is zero and taken if the Y bit is one. The Y bit may be set or cleared as desired to aid in branch prediction.

The PowerPC processor instruction set specifies the Y bit to be in bit 10 of in the instruction field of the branch condition operand (BO). The *PowerPC 601 Processor User's Manual*, Rev. 1, June 1993, page 3-68 states: "The y bit provides a hint about whether a conditional branch is likely to be taken and issued by the MPC601 to improve performance." Other processors may implement a prediction bit in other ways. The precise format of the prediction bit is not within the scope of the invention. The use of a prediction bit, in whatever form, is within the scope of the invention.

Prior art compilers have attempted to perform static branch prediction analysis in an effort to use the hardware features available. For example, RISC System/6000 compilers attempt to generate conditional branches with code that always falls through since the system always predicts the fall through path. Compilers for the PowerPC processor could use static analysis to set the branch prediction (Y bit). Static branch analysis, however, is typically insufficient to accurately predict actual program behavior and can actually reduce the branch prediction accuracy below the rate that would occur if no prediction were used. Whether a branch is taken or not taken depends on the data processed by the system and upon the assumptions and style of the programmer.

Thus, a technical problem exists to develop a method for analyzing program code to accurately predict the conditional branch selection for a program during actual use and for using that information to optimize program execution by modifying the executable code to optimize branch prediction.

SUMMARY OF THE INVENTION

The present invention is directed to a system and method for dynamically analyzing conditional branch selection in program code under realistic execution conditions and for applying that analysis to optimize that code.

The present invention provides a method for optimizing conditional branch prediction in a computer program running on a computer processor, the method comprising the steps of: compiling the computer program to create an executable program; executing the executable program on the computer processor; collecting statistics on the frequency of each conditional branch being taken or not taken; modifying the executable program to cause branch prediction to be correct a majority of the time based on the collected statistics.

It is therefore an object of the present invention to provide a method and system for dynamically analyzing program code branch behavior and for applying the results of that analysis to optimize the branch prediction for that code.

It is yet another object of the invention to introduce a method for determining an execution profile based on a representative workload for a program.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 3:
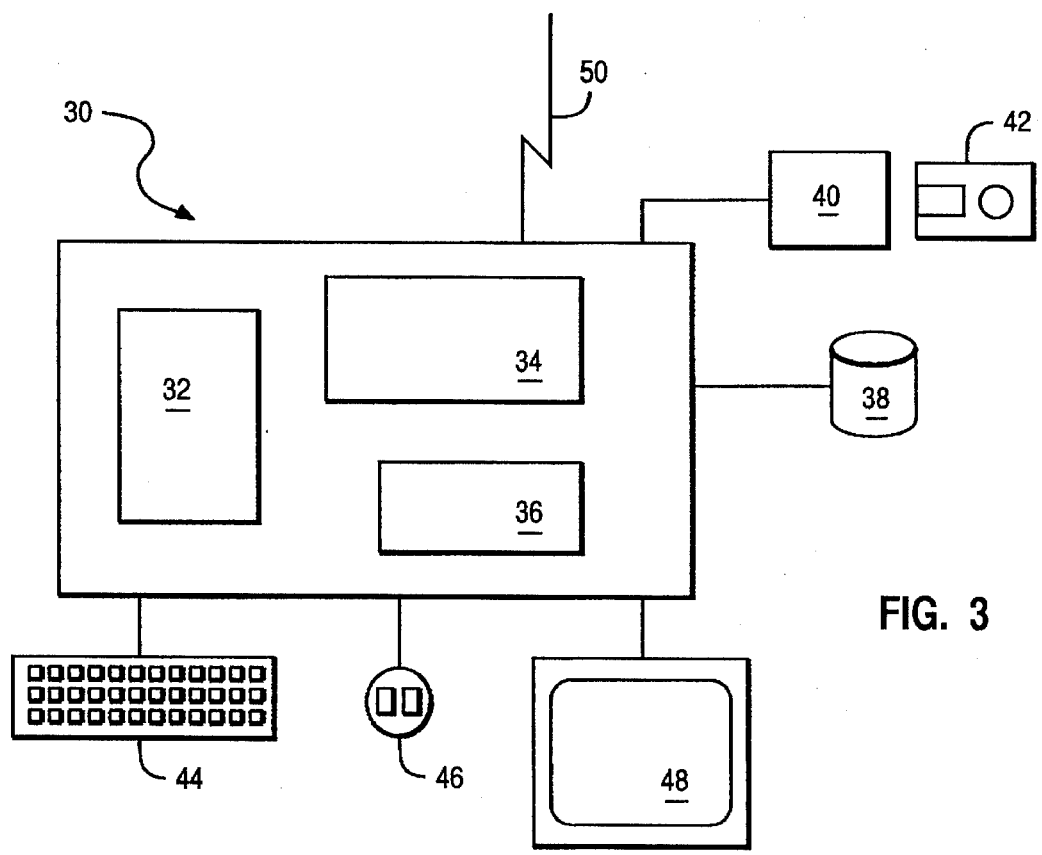
FIG. 3 is a block diagram illustrating a typical computer system for practicing the present invention.

The preferred embodiment of the present invention is practiced using a computer system such as that shown in FIG. 3. The system 30 includes one or more processors 32, memory 34, and an I/O controller 36. I/O controller 36 controls access to permanent storage such as disk unit 38. Disk unit 38 can contain magnetic or optical storage or similar non-volatile data storage technology. I/O controller also controls access to removable media unit 40 that can read or write on removable medium 42. Removable medium 42 can be any know device such as a flexible diskette, writable optical storage, read-only CD-ROM storage, or removable hard disk. I/O controller also controls input and output to the system user. Devices such as a keyboard 44, a pointing device 46 and a display device 48 are all controlled by the I/O controller. The computer system 30 may also be connected to other computer systems through a network link 50. This network link can be of any known type such as token ring, Ethernet or other network protocol and can connect to a local area network (LAN), a wide area network (WAN) or other network structure.

Computer system 30 can be a computer system such as the IBM RISC System/6000 or IBM PowerPC processor. Other computer systems with similar pipelined architectures could be used as the computer system without departing from the spirit of the invention. The present invention operates in the memory of the computer system. The preferred embodiment of the present invention is embodied in a computer readable medium that causes the computer system to perform the novel process steps of the invention. When the computer readable medium is combined with a computer system, the combination creates a novel and non-obvious apparatus for optimizing branch prediction in a pipelined system.

Figure 2:
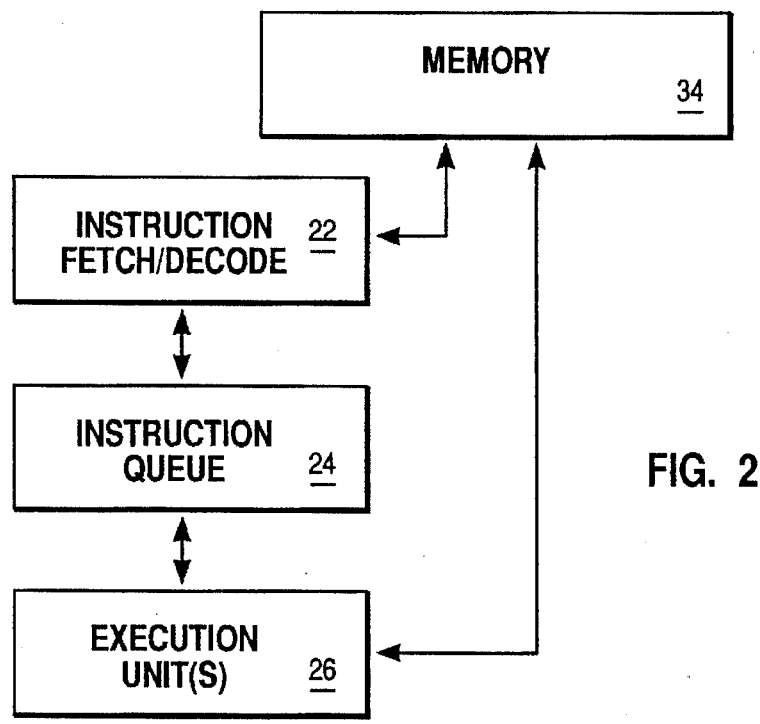
FIG. 2 is a block diagram illustrating the components of a pipelined processor system.

The instruction fetch, decode and execution differs between different computer system architectures. A generalized view of the process is shown in FIG. 2. The instructions are first fetched from memory 34 and decoded 22. The decoded instructions are placed in the instruction queue 24. The processor dispatches instructions from the instruction queue to one or more execution units 26 that execute the instruction including accessing memory 34. The system of the present invention works with pipelined computer systems that enable parallel processing of the instruction fetch, decode and execution stages so that the processing for successive instructions is overlapped.

Figure 1:
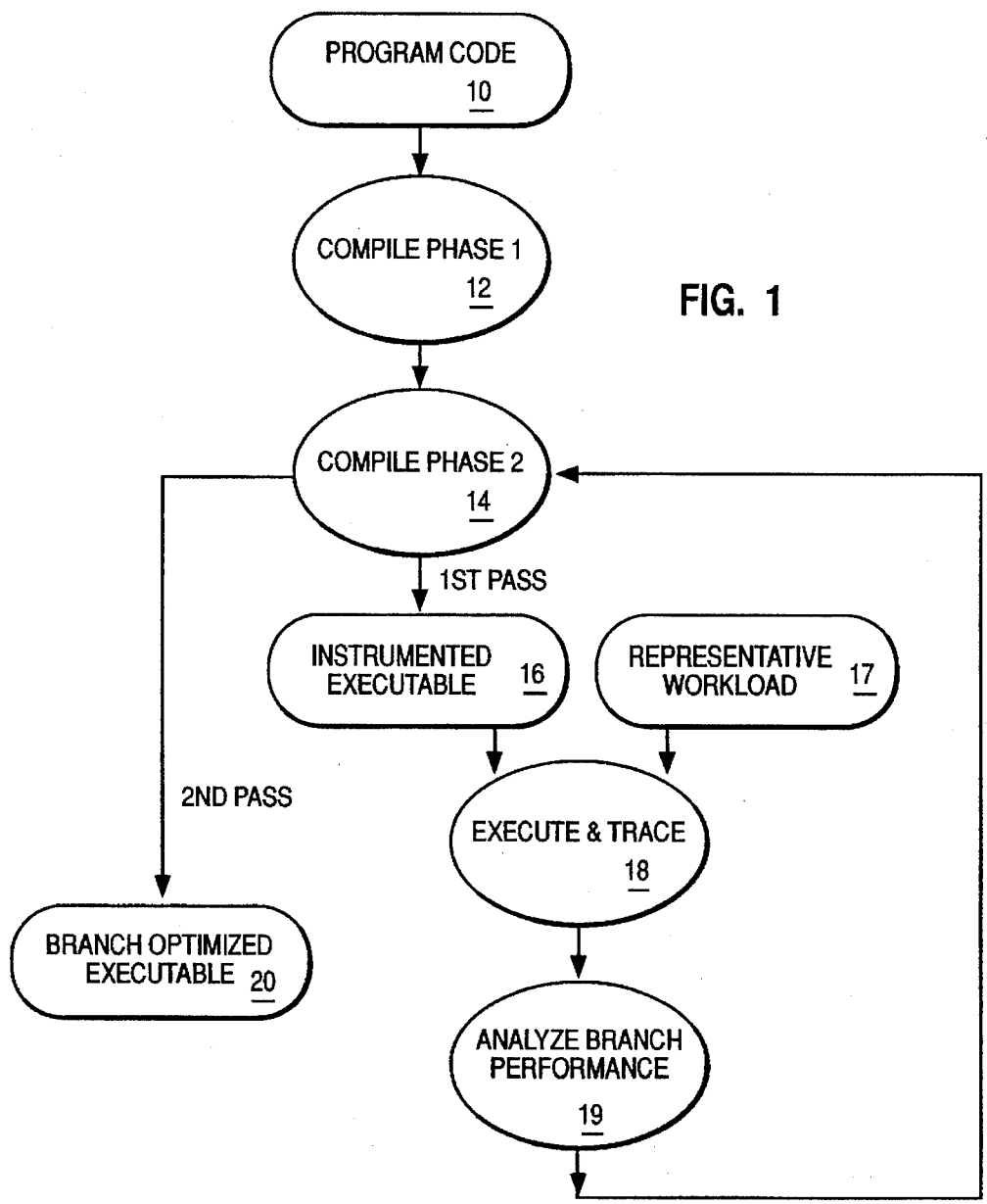
FIG. 1 is a flowchart illustrating the data flow in a system according to the present invention.

The preferred embodiment of the present invention operates as shown in FIG. 1. The program to be optimized 10 is compiled using a compiler with a standard branch prediction algorithm. The program is compiled through phases 1 and 2 12 14 to produce executable code 16. The executable code 16 is executed with a representative workload 17 as input. Representative workload 17 is selected as representative of the workload for which system through put improvement is desired.

In the preferred embodiment the program code is "instrumented" to collect the desired information by the compiler. Instrumentation of code refers to the process of adding code that generates specific information to a log. Instrumentation allows collection of the minimum specific data required to perform the branch prediction analysis. General purpose trace tools can be used as an alternative method for collecting data. General purpose trace tools collect more information about the execution of the code with the branch history information interspersed with the other execution information.

During execution 18 of the representative workload, statistics on branch selection are collected. The collected data or trace data is analyzed 19 and optimized branch prediction data is generated. The collected data is analyzed to determine how often the code branches in the direction opposite to that predicted by the processor.

The optimized branch prediction data is fed back to the second phase of the compiler during recompilation of the program code where it is used to optimize the code to produce an optimized executable code module 20. Program code for a processor that does not have a branch prediction bit is modified to meet the branch prediction assumptions of the processor. For example, code generated for an IBM RISC System/6000 processor is modified by changing the branch condition and the branch target address to meet the "branch not taken" assumption of the RISC System/6000 processor. As an alternative to recompilation, the executable code generated in the first compilation could be modified directly using the branch prediction data. In the PowerPC processor, for example, bit 10 of the branch condition operand instruction can be set or cleared based on the prediction data.

Direct modification of a branch prediction bit is less intrusive to the program code than restructuring the code. This modification is less likely to introduce unwanted artifacts into the code. Direct modification allows guaranteed preservation of functionality; at worse, performance will be slower than the unoptimized code.

Direct modification of the branch prediction bit also allows optimization of products obtained only in executable form. Instrumentation and modification of the executable code allows modification without access to the original source code. Instrumentation of executable code is known in the art and could be applied in this case to generate a trace file for branch prediction analysis.

The optimized branch prediction data contains an indication of whether or not certain branches were taken or not during execution of the representative workload. This data is used to restructure the program to take advantage of the actual branch history. The optimized program code will exhibit improved performance on workloads that are the same or similar to those used for profiling. If the workload differs greatly performance could be worse.

A program meant for execution on a RISC System/6000, for example, where the hardware branch prediction circuitry predicts "branch not taken" is restructured so that the predominant behavior is to not take the branch. A program meant for the PowerPC processor is modified by setting or clearing the Y bit to improve branch prediction.

Figure 4:
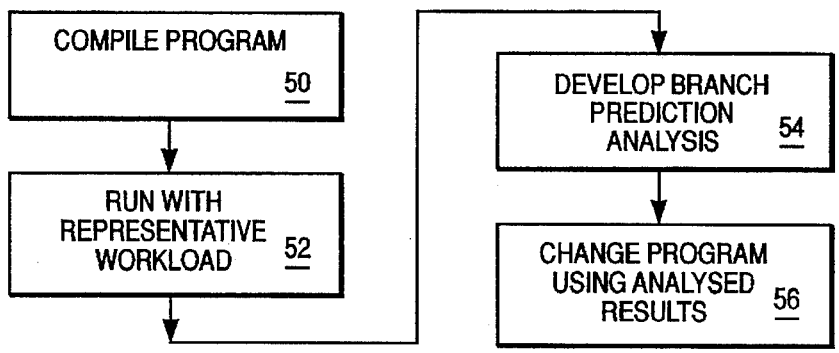
FIG. 4 is a flowchart illustrating the steps of the method of the present invention.

An example of code modification for the PowerPC processor is shown below. This example illustrates only a small portion of code. In actual programs, it will be realized that significantly more code must be analyzed and modified. FIG. 4 shows the process flow.

1. The process first compiles the code 50 to collect execution profile data. The code to be analyzed is shown in Table 1. The first pass assembly code generated by the compiler is shown in Table 2. The executable program is instrumented to optimize branch prediction. This can be done by adding code to count the number of times a branch is taken or not taken.

2. The instrumented program is then run 52 for the desired or representative workload. Alternatively, an existing trace tool can be used to collect data from the original uninstrumented program.

```
Example code loop:
    for (i = 0; i < 1000; i++)
    {
    if    ( d[i] == -1) /* Assume only 5% of the elements in d[i] are -1 */
        {
        j = j + (i << 1);
        d[i] = j;
        }
    else
        d[i] = i;
    }
```

3. The profile data or trace data is then analyzed 54 to determine branch tendencies, i.e. which way each branch is typically executed (taken or not.) In the above example, the branch at instruction address

TABLE 2

| 0x10000254 | 84860004 | lu r4,0x4(r6) | |
|---|---|---|---|
| 0x10000258 | 7ca31814 | a r5,r3,r3 | |
| 0x1000025c | 2c04ffff | cmpi cr0,r4,−1 | |
| 0x10000260 | 40820018 | bne 0x10000278 | /* y=0, S=0 => |
| 0x10000264 | 7c002814 | a r0,r0,r5 | predict not taken */ |
| 0x10000268 | 90060000 | st r0,0x0(r6) | /* => predicted |
| 0x1000026c | 30630001 | ai r3,r3,0x1 | incorrectly 95% */ |
| 0x10000270 | 4200ffe4 | bdnge 0x10000254 | |
| 0x10000274 | 48000010 | b 0x10000284 | |
| 0x10000278 | 90660000 | st r3,0x0(r6) | |
| 0x1000027c | 30630001 | ai r3,r3,0x1 | |
| 0x10000280 | 4200ffd4 | bdnge 0x10000254 | |
| 0x10000284 | 4e800020 | br | |

0x10000260 is taken 950 times and not taken 50 times (i.e. d[i] is usually not equal to −1.)

4. The program code is then modified based on the branch prediction. Modifications are made to make the code match the assumptions of the processor on which it will be executed. This modification, in the preferred embodiment, adjusts the Y bit the executable image for a program for a PowerPC processor as follows:

For each conditional branch instruction in the executable program image:

set the Y bit to 1 if:
the branch is predicted taken (the displacement is negative) but the profile data shows it is taken less than 50% of the time (i.e. usually not taken); or
the branch is predicted not taken (positive displacement) and the profile data shows that it is taken more than 50% of the time (i.e. usually taken.)
otherwise, set the Y bit to 0 (i.e. the branch is predicted taken and usually taken or predicted not taken and usually not taken.)

TABLE 3

| 0x10000254 | 84860004 | lu r4,0x4(r6) | |
|---|---|---|---|
| 0x10000258 | 7ca31814 | a r5,r3,r3 | |
| 0x1000025c | 2c04ffff | cmpi cr0,r4,−1 | |
| 0x10000260 | 40A20018 | bne 0x10000278 | /* y=1, S=0 => |
| 0x10000264 | 7c002814 | a r0,r0,r5 | predict taken */ |
| 0x10000268 | 90060000 | st r0,0x0(r6) | /* => predicted |
| 0x1000026c | 30630001 | ai r3,r3,0x1 | correctly 95% */ |
| 0x10000270 | 4200ffe4 | bdnge 0x10000254 | |
| 0x10000274 | 48000010 | b 0x10000284 | |
| 0x10000278 | 90660000 | st r3,0x0(r6) | |
| 0x1000027c | 30630001 | ai r3,r3,0x1 | |
| 0x10000280 | 4200ffd4 | bdnge 0x10000254 | |
| 0x10000284 | 4e800020 | br | |

The resulting optimized code is shown in Table 3. Modifications to code without a branch prediction bit are made by changing the branch conditions or by restructuring code.

Other forms of processor optimization can be introduced using the techniques of the present invention. Instructions likely to affect performance can be instrumented and then the program code modified to match program execution to processor expectations.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method for optimizing conditional branch prediction in a computer program running on a computer processor having branch prediction logic, the computer program including a plurality of conditional branches, the method comprising the steps of:

compiling the computer program to create an executable program;

executing the executable program on the computer processor using a workload;

collecting statistics on the frequency of conditional branch being taken or not taken for each of the plurality of conditional branches;

calculating for each conditional branch a percent of branches correctly predicted by said branch prediction logic;

modifying the executable program by setting a branch prediction indicator to reverse the branch prediction logic selection of each conditional branch for which said branch prediction logic incorrectly predicted the branch a majority of the time.

2. A computer program product for use with a compiler for optimizing conditional branch prediction, said computer program product comprising:

a computer usable medium having computer readable program code means embodied in said medium for causing said computer to optimize branch prediction in a computer program, said computer program product having:

computer readable program code means for causing a computer to compile the program;

computer readable program code means for causing a computer to execute the compiled program and collect statistics on the percent of time each of said plurality of conditional branches is taken or not taken;

computer readable program code means for causing a computer to analyze the collected statistics and determine an optimal branch prediction for each of said plurality of conditional branches;

computer readable program code means for causing a computer to determine, for each conditional branch, whether a hardware branch prediction logic correctly predicted that branch a majority of the time;

computer readable program code means for causing a computer to modify said executable program by setting a branch prediction indicator to reverse the hardware branch prediction of individual conditional branches so that branches are correctly predicted based on said optimal branch prediction.

3. A system for optimizing branch prediction in a program having a plurality of conditional branches and operating on a pipelined computer system having branch prediction logic, the system comprising:

means for compiling the program to create an executable program;

means for executing the executable program and collecting statistics on the percent of time each of said plurality of conditional branches is taken or not taken;

means for comparing the collected statistics and determining whether a hardware branch prediction for each of said plurality of conditional branches is correct a majority of the time;

means for modifying said executable program by setting a branch prediction indicator to reverse said branch prediction logic for those conditional branches not correctly predicted by said hardware branch prediction.

* * * * *